United States Patent
Enescu et al.

(10) Patent No.: US 12,476,724 B2
(45) Date of Patent: Nov. 18, 2025

(54) BEAM MANAGEMENT

(71) Applicant: Nokia Technologies Oy, Espoo (FI)

(72) Inventors: Mihai Enescu, Espoo (FI); Sami-Jukka Hakola, Oulu (FI); Juha Pekka Karjalainen, Oulu (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 18/563,158

(22) PCT Filed: Jun. 15, 2021

(86) PCT No.: PCT/EP2021/066066
§ 371 (c)(1),
(2) Date: Nov. 21, 2023

(87) PCT Pub. No.: WO2022/262949
PCT Pub. Date: Dec. 22, 2022

(65) Prior Publication Data
US 2024/0243799 A1 Jul. 18, 2024

(51) Int. Cl.
*H04B 17/318* (2015.01)
*H04B 7/08* (2006.01)

(52) U.S. Cl.
CPC ........... *H04B 17/328* (2023.05); *H04B 7/088* (2013.01)

(58) Field of Classification Search
CPC ...................................... H04B 7/088
USPC ............................................ 375/316
See application file for complete search history.

(56) References Cited

U.S. PATENT DOCUMENTS

| | | | |
|---|---|---|---|
| 2011/0125534 A1* | 5/2011 | Dean | G16H 10/60 705/2 |
| 2019/0165983 A1 | 5/2019 | Nakayama | |
| 2020/0053721 A1 | 2/2020 | Cheng et al. | |
| 2020/0059290 A1 | 2/2020 | Pan et al. | |
| 2020/0267571 A1 | 8/2020 | Park et al. | |
| 2020/0336188 A1 | 10/2020 | Wang et al. | |

(Continued)

FOREIGN PATENT DOCUMENTS

| | | |
|---|---|---|
| WO | 2020/166958 A1 | 8/2020 |
| WO | 2021/032541 A1 | 2/2021 |

OTHER PUBLICATIONS

"3rd Generation Partnership Project; Technical Specification Group Radio Access Network; NR; Physical layer procedures for control (Release 16)", 3GPP TS 38.213, V16.4.0, Dec. 2020, pp. 1-181.

(Continued)

*Primary Examiner* — Lihong Yu
(74) *Attorney, Agent, or Firm* — Barta Jones, PLLC

(57) ABSTRACT

According to various examples, there is provided a User Equipment, UE, comprising means for: receiving an indication of a type of parameter to be reported by the UE, wherein the type of parameter characterises one or more receive, Rx, of the UE via which one or more Reference Signals, RSs, are received; determining one or more values of the indicated type of parameter for at least one of the one or more RSs received by at least one of the one or more Rx beams of the UE; and sending information indicative of the determined one or more values of the indicated type of parameter for the at least one of the one or more RSs received by the at least one of the one or more Rx beams of the UE.

17 Claims, 4 Drawing Sheets

(56) References Cited

U.S. PATENT DOCUMENTS

| | | | |
|---|---|---|---|
| 2021/0041522 A1* | 2/2021 | Manolakos | G01S 1/045 |
| 2021/0067233 A1 | 3/2021 | Guan et al. | |
| 2021/0105749 A1 | 4/2021 | Zhou et al. | |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Details of QCL assumptions and related RS design considerations", 3GPP TSG RAN WG1 Meeting #89, R1-1706940, Agenda item: 7.1.2.4.5, Huawei, May 15-19, 2017, 6 pages.

"QCL/QCB design for NR MIMO", 3GPP TSG RAN WG1 Meeting #89, R1-1707134, Agenda: 7.1.2.4.5, ZTE, May 15-19, 2017, pp. 1-9.

"On QCL for NR", 3GPP TSG RAN WG1 Meeting #89, R1-1707369, Agenda: 7.1.2.4.5, Intel Corporation, May 15-19, 2017, pp. 1-4.

"Discussion on QCL", 3GPP TSG RAN WG1 #89, R1-1708601, Agenda: 7.1.2.4.5, Qualcomm Incorporated, May 15-19, 2017, pp. 1-3.

"On QCL", 3GPP TSG-RAN WG1 #89, R1-1708710, Agenda: 7.1.2.4.5, Ericsson, May 15-19, 2017, pp. 1-6.

"On QCL Framework and Configurations in NR", 3GPP TSG RAN WG1#89, R1-1708929, Agenda: 7.1.2.4.5, Nokia, May 15-19, 2017, 6 pages.

"3rd Generation Partnership Project; Technical Specification Group Radio Access Network; NR; User Equipment (UE) radio access capabilities (Release 16)", 3GPP TS 38.306, V16.3.0, Dec. 2020, pp. 1-135.

Lim et al., "Artificial Intelligence-Based Beam Management for High Speed Applications in mmWave Spectrum", IEEE Globecom Workshops (GC Wkshps), Dec. 7-11, 2020, 6 pages.

International Search Report and Written Opinion received for corresponding Patent Cooperation Treaty Application No. PCT/EP2021/066066, dated Mar. 16, 2022, 16 pages.

"Enhancements on Multi-beam Operation", 3GPP TSG-RAN WG1 Meeting #104-e, Tdoc R1-2101313, Agenda: 8.1.1, Ericsson, Jan. 25-Feb. 5, 2021, 22 pages.

"Beam management enhancement for NR from 52.6GHz to 71GHz", 3GPP TSG RAN WG1#104e, R1-2100852, Agenda: 8.2.4, Sony, Jan. 25-Feb. 5, 2021, 4 pages.

* cited by examiner

Table 5.2.2.1-2: 4-bit CQI Table

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Robustness Offsets: 0, 1, 2, 3

FIG 6

Table 5.1.3.1-1: MCS index table 1 for PDSCH

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Robustness Offsets: 0, 1, 2, 3

FIG 7

BEAM MANAGEMENT

RELATED APPLICATION

This application was originally filed as PCT Application No. PCT/EP2021/066066, filed on Jun. 15, 2021, which is incorporated herein by reference in its entirety.

TECHNOLOGICAL FIELD

Examples of the present disclosure relate to beam management. Some examples, though without prejudice to the foregoing, relate to beam management procedures in 3GPP New Radio, NR, operation and beyond. Certain examples relate to determining an indicator for characterising beams of User Equipment, UE, of a Radio Access Network, RAN.

BACKGROUND

Conventional beam management procedures are based on a pre-determined framework governed by pre-defined rules, wherein both a UE and an access node of a RAN (such as an NR Base station—gNB) perform measurements on Reference Signals, RSs. The measurements/computed quantities are reported (such as by the UE reporting certain pre-defined UE capability parameters) and specified procedures are executed accordingly. For instance, the gNB may make scheduling decisions based on the UE's reported measurements of RSs that the UE has received and measured. The conventional beam management procedures and framework consume an amount of resources for each of the UE and the gNB, and involve and amount of signalling overhead. The conventional beam management procedures and framework are based on tight, fixed, pre-determined and inflexible specified procedures.

Conventional beam management procedures are not always optimal. In some circumstances, it can be desirable provide, to a gNB, improved feedback concerning beams of a UE (e.g., UE receive, Rx, beams and UE transmit, Tx, beams). In some circumstances, it can be desirable to provide, to a gNB, new indicators for characterising UE beams, whereupon the gNB can use such indicators to make appropriate/optimal scheduling decisions. In some circumstances, it can be desirable to provide enhanced flexibility, choice and control over the beam related parameters/metrics to be measured and reported. In some circumstances it can be desirable to provide a beam management procedure that consumes less resources and reduces signalling overhead as compared to conventional beam management procedures.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims. Any embodiments, examples and features described in this specification that do not fall under the scope of the independent claims are to be interpreted as examples useful for understanding various embodiments of the invention.

According to at least some examples of the disclosure there is provided a User Equipment, UE, comprising means for:
  receiving an indication of a type of parameter to be reported by the UE, wherein the type of parameter characterises one or more receive, Rx, beams of the UE via which one or more Reference Signals, RSs, are received;
  determining one or more values of the indicated type of parameter for at least one of the one or more RSs received by at least one of the one or more Rx beams of the UE; and
  sending information indicative of the determined one or more values of the indicated type of parameter for the at least one of the one or more RSs received by the at least one of the one or more Rx beams of the UE.

According to various, but not necessarily all, examples of the disclosure there is provided a method comprising:
  receiving an indication of a type of parameter to be reported by the UE, wherein the type of parameter characterises one or more receive, Rx, beams of the UE via which one or more Reference Signals, RSs, are received;
  determining one or more values of the indicated type of parameter for at least one of the one or more RSs received by at least one of the one or more Rx beams of the UE; and
  sending information indicative of the determined one or more values of the indicated type of parameter for the at least one of the one or more RSs received by the at least one of the one or more Rx beams of the UE.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

According to various, but not necessarily all, examples of the disclosure there is provided computer program instructions for causing an apparatus to perform:
  receiving an indication of a type of parameter to be reported by the UE, wherein the type of parameter characterises one or more receive, Rx, beams of the UE via which one or more Reference Signals, RSs, are received;
  determining one or more values of the indicated type of parameter for at least one of the one or more RSs received by at least one of the one or more Rx beams of the UE; and
  sending information indicative of the determined one or more values of the indicated type of parameter for the at least one of the one or more RSs received by the at least one of the one or more Rx beams of the UE.

According to various, but not necessarily all, examples of the disclosure there is provided an apparatus comprising:
  at least one processor; and
  at least one memory including computer program instructions;
  the at least one memory and the computer program instructions configured to, with the at least one processor, cause the apparatus at least to perform:
    receiving an indication of a type of parameter to be reported by the UE, wherein the type of parameter characterises one or more receive, Rx, beams of the UE via which one or more Reference Signals, RSs, are received;

determining one or more values of the indicated type of parameter for at least one of the one or more RSs received by at least one of the one or more Rx beams of the UE; and sending information indicative of the determined one or more values of the indicated type of parameter for the at least one of the one or more RSs received by the at least one of the one or more Rx beams of the UE.

According to various, but not necessarily all, examples of the disclosure there is provided a non-transitory computer readable medium encoded with instructions that, when performed by at least one processor, causes at least the following to be perform:

receiving an indication of a type of parameter to be reported by the UE, wherein the type of parameter characterises one or more receive, Rx, beams of the UE via which one or more Reference Signals, RSs, are received;

determining one or more values of the indicated type of parameter for at least one of the one or more RSs received by at least one of the one or more Rx beams of the UE; and sending information indicative of the determined one or more values of the indicated type of parameter for the at least one of the one or more RSs received by the at least one of the one or more Rx beams of the UE.

According to at least some examples of the disclosure there is provided a Radio Access Network, RAN, node comprising means for:

sending an indication of a type of parameter to be reported by a User Equipment, UE, wherein the type of parameter characterises one or more receive, Rx beams of the UE via which one or more Reference Signals, RSs, are received;

receiving information indicative of one or more values, determined by the UE, of the indicated type of parameter for the at least one of the one or more RSs received by at least one of the one or more Rx beams of the UE.

According to various, but not necessarily all, examples of the disclosure there is provided a method comprising:

sending an indication of a type of parameter to be reported by a User Equipment, UE, wherein the type of parameter characterises one or more receive, Rx beams of the UE via which one or more Reference Signals, RSs, are received; and receiving information indicative of one or more values, determined by the UE, of the indicated type of parameter for the at least one of the one or more RSs received by at least one of the one or more Rx beams of the UE.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

According to various, but not necessarily all, examples of the disclosure there is provided computer program instructions for causing an apparatus to perform:

sending an indication of a type of parameter to be reported by a User Equipment, UE, wherein the type of parameter characterises one or more receive, Rx beams of the UE via which one or more Reference Signals, RSs, are received; and receiving information indicative of one or more values, determined by the UE, of the indicated type of parameter for the at least one of the one or more RSs received by at least one of the one or more Rx beams of the UE.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

sending an indication of a type of parameter to be reported by a User Equipment, UE, wherein the type of parameter characterises one or more receive, Rx beams of the UE via which one or more Reference Signals, RSs, are received; and receiving information indicative of one or more values, determined by the UE, of the indicated type of parameter for the at least one of the one or more RSs received by at least one of the one or more Rx beams of the UE.

According to various, but not necessarily all, examples of the disclosure there is provided a non-transitory computer readable medium encoded with instructions that, when performed by at least one processor, causes at least the following to be perform:

sending an indication of a type of parameter to be reported by a User Equipment, UE, wherein the type of parameter characterises one or more receive, Rx beams of the UE via which one or more Reference Signals, RSs, are received; and receiving information indicative of one or more values, determined by the UE, of the indicated type of parameter for the at least one of the one or more RSs received by at least one of the one or more Rx beams of the UE.

The following portion of this 'Brief Summary' section describes various features that can, mutatis mutandis, be features of any of the examples described in the foregoing portion of the 'Brief Summary' section. The description of a function should additionally be considered to also disclose any means suitable for performing that function.

In some but not necessarily all examples, the indicated type of parameter may comprise:

an indicator indicative of one or more characteristics of the at least one of the one or more Rx beams of the UE via which the at least one of the one or more RSs was received; and/or one or more robustness indicators, wherein the one or more robustness indicators are indicative of a robustness of the at least one of the one or more Rx beams of the UE via which the at least one of the one or more RSs was received.

In some but not necessarily all examples, the UE may further comprise means for receiving, via the at least one of the one or more Rx beams of the UE, the at least one of the one or more RSs.

In some but not necessarily all examples, the UE may further comprise means for receiving information for enabling the UE to determine how to determine the one or more values of the indicated type of parameter for the at least one of the one or more RSs received by the at least one of the one or more Rx beams of the UE.

In some but not necessarily all examples, determining the one or more values of the indicated type of parameter for the at least one of the one or more RSs may comprise assigning the at least one of the one or more RSs to one of a plurality of groups that characterises the at least one of the one or more Rx beams of the UE in accordance with the indicated type of parameter.

In some but not necessarily all examples, the information indicative of the determined one or more values of the indicated type of parameter for the at least one of the one or more RSs may comprise an indication of one of a plurality of groups, wherein each group is associated with a range of values of the indicated type of parameter.

In some but not necessarily all examples, the indicated type of parameter may relate to temporal operational characteristics of the one or more Rx beams of the UE via which the one or more RSs were received.

In some but not necessarily all examples, determining the one or more values of the indicated type of parameter for the at least one of the one or more RSs may be based at least part on a beam switching delay for the UE to switch to the at least one of the one or more Rx beams of the UE via which the at least one of the one or more RSs was received.

In some but not necessarily all examples, the indicated type of parameter may relate to a reception quality of the at least one of the one or more RSs via the at least one of the one or more Rx beams of the UE.

In some but not necessarily all examples, the indicated type parameter may relate to one or more of:
  Received Signal Received Power, RSRP, of the at least one of the one or more RSs received via the at least one of the one or more Rx beams of the UE;
  Signal to Noise Ratio, SINR, of the at least one of the one or more RSs received via the at least one of the one or more Rx beams of the UE; and
  Angle of Arrival, AOA, of the at least one of the one or more RSs received via the at least one of the one or more Rx beams of the UE.

In some but not necessarily all examples, the indicated type of parameter may comprise an indicator indicative of one or more characteristics of at least one transmit, Tx, beam, in correspondence with the at least one of the one or more Rx beams of the UE via which the at least one of the one or more RSs was received.

In some but not necessarily all examples, the indicated type of parameter may relate to one or more of:
  Maximum Permissible Exposure, MPE, of at least one Tx beam of the UE in correspondence with the at least one of the one or more Rx beams of the UE via which the at least one of the one or more RSs was received;
  power back off of at least one Tx beam of the UE in correspondence with the at least one of the one or more Rx beams of the UE via which the at least one of the one or more RSs was received; and
  Angle of Departure, AOD, of at least one Tx beam of the UE in correspondence with the at least one of the one or more Rx beams of the UE via which the at least one of the one or more RSs was received.

In some but not necessarily all examples, the UE may further comprise means for:
  determining one or more first values of the indicated type of parameter for a first RS received via a first Rx beam of the one or more Rx beams of the UE; and
  determining one or more second values of the indicated type of parameter for the first RS received via the first Rx beam.

In some but not necessarily all examples, the UE may further comprise means for:
  determining one or more first values of the indicated type of parameter for a first RS received via a first Rx beam of the one or more Rx beams of the UE; and
  determining one or more second values of the indicated type of parameter for the first RS received via a second Rx beam of the one or more Rx beams of the UE.

In some but not necessarily all examples, the indicated type of parameter may be a parameter whose values are associated with one or more Channel Quality Indicator, CQI, indexes.

In some but not necessarily all examples, the information indicative of the determined one or more values of the indicated type of parameter for the at least one of the one or more RSs received by the at least one of the one or more Rx beams of the UE may have a bit-length of 2.

In some but not necessarily all examples, the UE may further comprise means for performing one or more beam management operations based at least in part on the information indicative of the determined one or more values of the indicated type of parameter for the at least one of the one or more RSs received by the at least one of the one or more Rx beams of the UE.

In some but not necessarily all examples, the UE further comprises means for: controlling a transmission from the UE based at least in part on the information indicative of the determined one or more values of the indicated type of parameter for the at least one of the one or more RSs received by the at least one of the one or more Rx beams of the UE.

In some but not necessarily all examples, the UE may further comprise means for determining a Modulation and Coding Scheme, MCS, based at least in part on the information indicative of the determined one or more values of the indicated type of parameter for the at least one of the one or more RSs received by the at least one of the one or more Rx beams of the UE.

In some but not necessarily all examples, the RAN node may further comprise means for controlling scheduling based at least in part on the information indicative of the determined one or more values of the indicated type of parameter for the at least one of the one or more RSs received by the at least one of the one or more Rx beams of the UE.

In some but not necessarily all examples, the RAN node may further comprise means for: controlling a transmission from the RAN node based at least in part on the information indicative of the determined one or more values of the indicated type of parameter for the at least one of the one or more RSs received by the at least of the one or more Rx beams of the UE.

In some but not necessarily all examples, the RAN node may further comprise means for adjusting an MCS based at least in part on the received information indicative of the determined one or more values of the indicated type of parameter for the at least one of the one or more RSs received by the at least one of the one or more Rx beams of the UE.

According to various, but not necessarily all, examples of the disclosure there are provided examples as claimed in the appended claims.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which:

FIG. 6 shows an example of a mapping of robustness indicators to Channel Quality Indicator, CQI, Indexes;

FIG. 7 shows an example of a mapping of robustness indicators to Modulation and Coding Scheme, MCS, Indexes;

Figure 1:
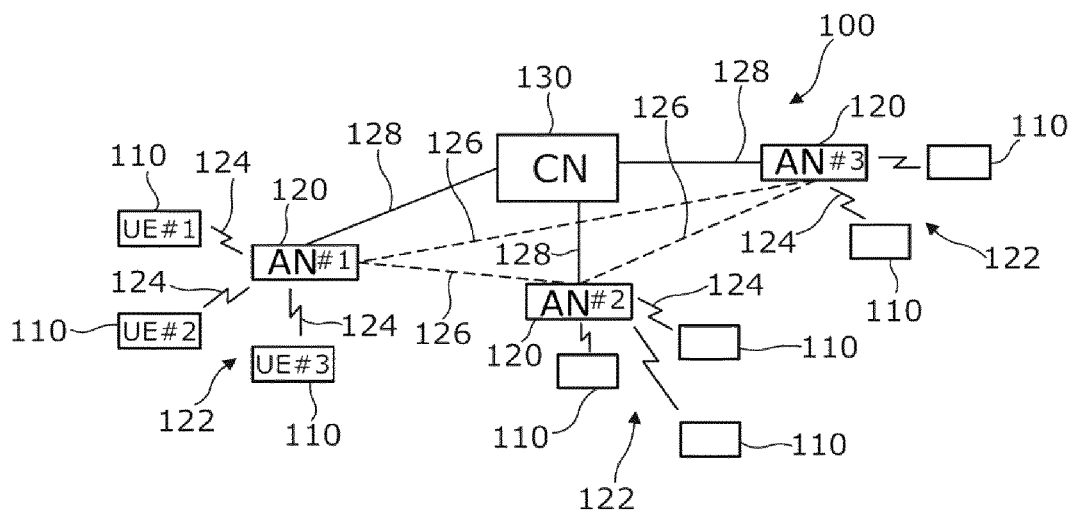
FIG. 1 shows an example of a Radio Access Network suitable for use with examples of the present disclosure.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

Abbreviations/Definitions

AI Artificial Intelligence
CQI Channel Quality Indicator
CSI Channel State Information
DCI Downlink Control Information
DL Downlink
DM Demodulation
gNB NR Base station, 5G Node B
MAC Medium Access Control
MCS Modulation and Coding Scheme
ML Machine Learning
NR New Radio
OFDM Orthogonal Frequency Division Multiplexing
PDCCH Physical Downlink Control Channel
PDSCH Physical Downlink Shared Channel
PUCCH Physical Uplink Control Channel
PUSCH Physical Uplink Shared Channel
QCL Quasi Co-Location
RAN Radio Access Network
RRC Radio Resource Control
RS Reference Signal
Rx Reception/Receive
RSRP Reference Signal Received Power
SSB Synchronization Signal Block
SRS Sounding Reference Signal
TCI Transmission Configuration Indicator
TRP Transmission and Reception Point
Tx Transmission/Transmit
UE User Equipment
UL Uplink

DETAILED DESCRIPTION

FIG. 1 schematically illustrates an example of a network 100 comprising a plurality of network nodes including terminal nodes 110 (also referred to as User Equipment, UE), access nodes 120 and one or more core nodes 130. The terminal nodes 110 and access nodes 120 communicate with each other. The access nodes 120 communicate with the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming is mandatory in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology-Dual Connection (MR-DC), not least for example such as:

Evolved Universal Terrestrial Radio Access-New Radio Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node 120 can be implemented as a single network equipment, or disaggregated/distributed over two or more RAN nodes, such as a central unit (CU), a distributed unit (DU), a remote radio head-end (RRH), using different functional-split architectures and different interfaces.

In the following description, an access node will be referred to as gNB 120 and a terminal node 110 will be referred to as a UE 110.

There now follows a description of beam management principles.

Release 17 and legacy NR releases define beam management procedures. One of the key aspects is the possibility of a UE to perform beam management operations, these being typically governed by various rules such as Quasi Co-Location, QCL and time offsets which are reported by the UE, for example as UE capabilities.

Beam management comprises a set of procedures and functionalities that enable, maintain and refine the transmit beam (Tx beam) and receive beam (Rx beam) alignment between a transmitter and one or more receivers. The Tx/Rx beam can relate to a Beam Forming Function or a Mapping Function or spatial filters used to transmit or receive a RS. Applying the same Beam forming/Mapping function or spatial filter forms the same beam (i.e., same direction, same shape, same power of the beam). A beam pair link established between the transmitter and the receiver comprises a transmit beam (Tx beam) and receive beam (Rx beam) pair. The beam pair link between a gNB and a UE may be the same or different in Downlink, D L, and Uplink, UL. In DL, the gNB provides the UE with a QCL-TypeD Reference Signal, RS, based on which the UE can set its receive beam and a spatial relation information in UL, based on which the UE can further set its transmit beam.

The QCL of two antenna ports means that the channel conditions for symbols transmitted from those antenna ports are similar and can be inferred from one to another.

Strictly speaking, QCL defines the relation between two reference signals at the UE receiver. In practice, the gNB can only guarantee that the properties of two reference signals are similar if the two reference signals are transmitted from the same Transmission and Reception Point, TRP. However, NR considers in general that the transmission of any reference signal can take place from any TRP.

Depending on the set of properties for the channel conditions, 3GPP Technical Specification, TS, 38.214 defines the following QCL-types: QCL-TypeA, QCL-TypeB, QCL-TypeC, QCL-TypeD. In QCL-TypeD, a spatial Rx parameter is employed to define the channel conditions and is used to support beamforming.

In section 5.1.5 of 3GPP TS 38.214, it states:
The quasi co-location types corresponding to each DL RS are given by the higher layer parameter qcl-Type in QCL-Info and may take one of the following values:
'typeA': {Doppler shift, Doppler spread, average delay, delay spread}
'typeB': {Doppler shift, Doppler spread}
'typeC': {Doppler shift, average delay}
'typeD': {Spatial Rx parameter}

A QCL-TypeD RS spatial source can be Synchronization Signal Block, SSB, or Channel State Information, CSI, RS. In beam indication for the target signal to be received (e.g., Demodulation, DM, RS of Physical Downlink Shared Channel, PDSCH; DM-RS of Physical Downlink Control Channel, PDCCH; CSI-RS) a UE is provided a Transmission Configuration Indicator, TCI, state (container) that comprises an indication of the QCL-TypeD RS. The UE applies the same Rx beam to receive target signal, as it used to receive the given QCL-TypeD source RS (SSB or CSI-RS resource) in the TCI state. The UE can be configured with up to 64 or 128 (if UE capability allows) TCI states. A definition of TCI State container is provided in 3GPP TS 38.331, section 6.3.2, Radio resource control information elements, TCI-State.

In the UL, the UE is provided a spatial source RS. It can be: an SSB; a CSI-RS or Sounding Reference Signal, SRS. For SSB or CSI-RS, the UE uses the Rx beam used to receive the given SSB or CSI-RS resource as a spatial relation for the Tx beam to transmit a target signal (e.g., PUSCH, PUCCH, SRS). Whereas, for SRS, the UE uses the same Tx beam (i.e., the same spatial relation) that it used to transmit the given SRS resource as the Tx beam to transmit target signal. A definition of the spatial relation information, e.g., for SRS, is provided in 3GPP TS 38.331, section 6.3.2, Radio resource control information elements, SRS-Config.

The main procedures and functionalities in beam management are:
measurements and reporting of candidate reference signals that can act as a source to determine transmit and receive beam pair in downlink and in uplink
typical assumption is that DL RSs are used for both DL and UL beam indication
Tx/Rx beam correspondence is assumed at the UE
the UE is explicitly configured with SSB and/or CSI-RS resources for L1-Reference Signal Received Power, RSRP, measurements and reporting (CSI-RS framework)

the UE may be configured with CSI-RS resource setting for up to 16 CSI-RS resource sets having up to 64 resources within each set. The total number of different CSI-RS resources over all resource sets is no more than 128

UE reports the Layer 1, L1, RSRP of {1, 2, 3 or 4} best SSBs or CSI-RSs per report config
The reporting comprises a resource index and L1-RSRP value beam indication/beam switching
 In DL, the UE is provided a TCI state for the target signal, based on which the UE can receive the target signal. The TCI state is provided either:
  with Radio Resource Control, RRC, configuration for P-CSI-RS (including Tracking Reference Signal, TRS)
  with Medium Access Control, MAC, Control Element, CE, for PDCCH (one active TCI state per CORESET), SP-CSI-RS, AP-CSI-RS, PDSCH (when follows PDCCH)
  with Downlink Control Information, DCI, for PDSCH (when explicit indication in use), and AP-CSI-RS (triggering of certain CSI-RS resource set(s)
 In UL, the UE is provided a spatial relation for the target signal based on which the UE forms the transmit beam. The provisioning of the spatial relation is either:
  RRC based (for P-SRS)
  MAC-CE based (for SP-SRS, AP-SRS, PUCCH, PUSCH (when follows PUCCH with resource ID=0)), or
  DCI based (indirectly for PUSCH (DCI indicates reference SRS(s) so that the UE shall transmit PUSCH with the same beam(s) as it transmitted given SRSs).
 Also, some default beam assumptions have been defined in Rel15/Rel16:
  PDSCH:
   If scheduling offset<timeDurationForQCL: the TCI state is the one of the lowest CORESET ID in the latest slot monitored by the UE
   If scheduling offset>=timeDurationForQCL: the TCI state is the one of the CORESET of the scheduling PDCCH if the TCI state is not provided in the DCI, or PDSCH reception is based on the TCI state provided in DCI
  AP-CSI-RS:
   If scheduling offset<beamSwitchTiming: the UE either aligns the TCI state with an overlapping other signal TCI state, or applies TCI state of the lowest CORESET ID in the latest slot monitored by the UE
  PUCCH/SRS
   If the spatial relation is not configured, in Frequency Range, FR, 2, the spatial relation is determined as follows:
    in case when the CORESET(s) are configured on the CC, the TCI state/QCL assumption follows the one of the CORESET with the lowest ID, or
    in case when any CORESETs are not configured on the CC, the activated TCI state with the lowest ID is applicable to PDSCH in the active DL-BWP of the CC
  PUSCH scheduled by DCI format 0_0 when there are no PUCCH resources configured on the active UL Bandwidth Part, BWP, CC in FR2 and in RRC-connected mode:
    The default spatial relation is the TCI state/QCL assumption of the CORESET with the lowest ID
 In multi-TRP scenario, a TCI codepoint may comprise two TCI states and as a default beam case the UE assumes the TCI states of the TCI codepoint with two TCI states with the lowest ID (e.g., for PDSCH)
 MAC-CE based beam switching, i.e., activation of TCI state in DL and activation of spatial relation RS in UL follows the following principles: UE applies the new assumption 3 ms after the UE has sent the HARQ-ACK for the PDSCH carrying the MAC-CE.

The UE-capability parameters are described as follows [38.306]:
 timeDurationForQCL: defines the minimum number of Orthogonal Frequency Division Multiplexing, OFDM, symbols required by the UE to perform PDCCH reception and applying spatial QCL information received in DCI for PDSCH processing as described in TS 38.214 clause 5.1.5. The UE shall indicate one value of the minimum number of OFDM symbols per each subcarrier spacing, that is {7, 14, or 28} for 60 kHz and {14, 28} for 120 kHz.
 beamSwitchTiming: indicates the minimum number of OFDM symbols between the DCI triggering of aperiodic CSI-RS transmission. The number of OFDM symbols is measured from the last symbol containing the indication to the first symbol of CSI-RS and it takes the values {14, 28, 48} for a Release 15 UE. The UE includes this field for each supported sub-carrier spacing. Release 16 has extended this parameter with beamSwitchTiming-r16 which indicates the minimum number of required OFDM symbols (224, 336) between the DCI triggering aperiodic CSI-RS and the corresponding aperiodic CSI-RS transmission in a CSI-RS resource set configured with repetition 'ON'.
 beamReportTiming: indicates the number of OFDM symbols between the last symbol of SSB/CSI-RS and the first symbol of the transmission channel containing beam report. The UE provides the capability for the band number for which the report is provided (where the measurement is performed). The UE includes this field for each supported sub-carrier spacing.
 groupBeamReporting: indicates whether the UE supports RSRP reporting for a group of two resources of reference signals. It is specified in 38.214 that if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters. In other words, if two CSI-RS and/or SSBs are received with the same UE beam, these are part of a group and this is indicated to the gNB accordingly. The introduction of Release 15 beam grouping sought to enable improved/smarter scheduling on reference signals which are received by the same UE spatial filter (i.e., the same UE beam), as reference signals that are part of the same group would experience the same delays etc, and hence would allow no further feedback from the UE to the gNB when changes between these beams is performed. A release 16 extension specified groupSINR-reporting-r16 which indicates whether UE supports group based L1-Signal-to-Interference-plus-Noise Ratio, SINR, reporting. The UE indicating support of this feature shall indicate support of ssb-csirs-SINR-measurement-r16.

A UE may be equipped with multiple panels of different capabilities in terms of panel activation and panel structure (e.g., differing: number of antenna elements, elementwise radiation patterns, etc). This can create a form of discrepancy on how the UE's panels and the associated UE Rx beams are used by the UE. This can yet moreover create a degree of uncertainly at the gNB, which can ultimately lead to higher latency operation as well as into more conservative transmission(s) in terms of how the UE's Rx beam information is handled to the gNB so that proper scheduling can be performed. Also, in particular with handheld UEs, a UE may be exposed to uncertainties such as rotation and beam blockage, such factors which may also decrease system performance and robustness.

Various examples of the present disclosure seek to provide one or more additional indications, and signalling for the same, wherein such indications characterise UE beams based on particular one or more parameters and determined values of the same. In such a manner, beams of the UE can be grouped into groups having similar operational characteristics based on the determined values of the particular one or more parameters associated with the UE's beams (e.g., classifying the UE's beams in accordance with their associated particular parameter values, i.e., based on the UE's beams being associated with parameter values within particular ranges of threshold values of parameter values). A gNB can select which type of characteristic/parameter is to be used (i.e., the gNB can thereby control which parameter, and value(s) for the same, is to be determined by the UEs and reported to the gNB. The gNB can use the indications/feedback concerning UE beams to control scheduling and transmissions.

As will be discussed below, examples of the present disclosure seek to address issues relating to how to provide a gNB with improved feedback relating to beams of a UE.

Various examples of the present disclosure seek to provide a new indication (referred to herein as a 'beam robustness indicator' or 'robustness offset') for characterising a UE's beams. As will be discussed below, a gNB can request a particular type of beam robustness indicator/offset to be determined and reported by the UE, whereupon the determined values of the particular type of beam robustness indicator/offset reported by the UE to the gNB can be used by the gNB for: facilitating advanced scheduling and advanced link adaptation.

In some examples, the gNB can select/control a type of indication/type of robustness offset that the UE is to determine value of and report. In other words, the gNB can request the type of parameter, which is associated with a Rx beam, whose parameter values are to be determined by the UE and reported to the gNB. In such a manner, the gNB is able to control the manner in which the UE beams are to be characterised and the reporting of the same.

In some examples, differing types of robustness offset can be requested by the gNB for the UE to report so as to characterize the UE's beams based on the requested type of robustness offset. In such a manner, the UE's beams can be characterized based on a particular parameter and a particular range/threshold of values of the particular parameter (such threshold values being associated with the particular type of robustness offset). Resources of RSs, received via a Rx beam of the UE, tagged with the same robustness offset value would be indicative of Rx beams operating under a same threshold parameter value. Whereas, resources of RSs, received via a Rx beam of the UE, tagged with differing robustness offset values would be indicative of Rx beams operating under different threshold parameter values.

In some examples, the robustness offset can be based on parameters associated with the UE's Rx beams that received a RS. In some examples, the robustness offset can be of representative of differing characteristics of the Rx beam via which resources of an RS are received. The robustness offset may be indicative of/related to one or more of: time/delay of switching between Rx beams, power of received RS, noise of received RS, and/or Angle of Arrival, AoA of received RS. For example, the robustness offset can comprise:

a delay-based robustness offset indicative of a time duration to switch between beams (i.e., such that beams tagged with the same delay-based robustness offset indicates that switching between such beams can occur within the same threshold time duration);

a RSRP-based robustness offset indicative of RSRP of the RS received via the UE's Rx beam (i.e., such that beams tagged with the same RSRP-based robustness offset indicates that such beams receive the RS within the same threshold power level);

a SINR-based robustness offset indicative of SINR of the RS received via the UE's Rx beam (i.e., such that beams tagged with the same SINR-based robustness offset indicates that such beams receive the RS within the same threshold noise ratio); and/or AoA-based robustness offset indicative of AoA of the RS received via the UE's Rx beam (i.e., such that beams tagged with the same AoA-based robustness offset indicates that such beams receive the RS within the same threshold AoA);

In some examples, the robustness offset can be based on parameters associated with the UE Tx beams corresponding to the UE's Rx beams that received the RS. For example, the reported robustness offset can be: Angle of Departure, AoD, -based; power back off-based; and Maximum Permissible Exposure, MPE-based.

Figure 2:
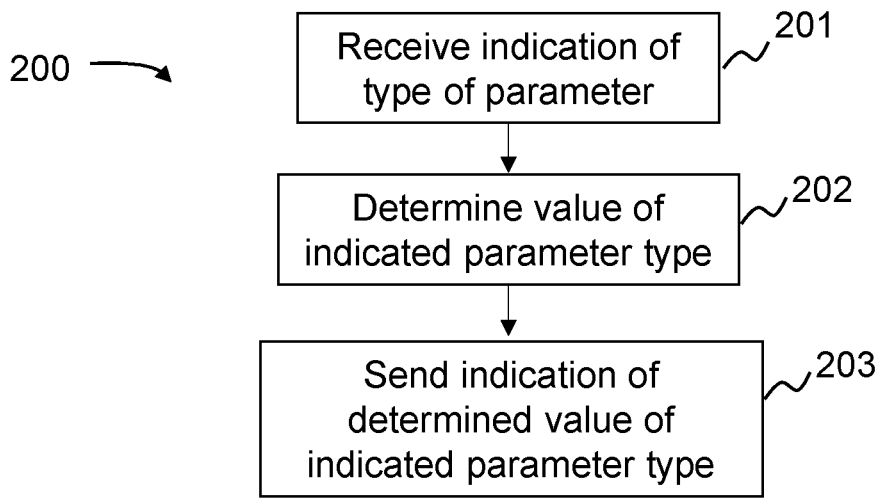
FIG. 2 shows an example of a method of the present disclosure.

FIG. 2 schematically illustrates an example of a method 200 according to the present disclosure.

It will be understood that each block and combinations of blocks illustrated in FIG. 2, as well as the further functions described below, can be implemented by various means, such as hardware, firmware, and/or software including one or more computer program instructions. For example, one or more of the functions described below can be performed by a duly configured apparatus (such as an apparatus, or UE, comprising means for performing the below described functions). One or more of the functions described below can be embodied by a duly configured computer program (such as a computer program comprising computer program instructions which embody the functions described below and which can be stored by a memory storage device and performed by a processor).

The blocks of FIG. 2 are functional and the functions therein, as well as the functions described below, can be performed by a single physical entity (such as a UE 110 of FIGS. 1 and 3, or an apparatus 10 as described with reference to FIG. 8). Accordingly, the functions of the blocks illustrated in FIG. 2, as well as the functions described below, can also represent functions of a UE 110, or an apparatus 10, comprising means for performing the described functions. The functions of the blocks illustrated in FIG. 2, as well as the functions described below, can also represent sections of instructions/code in a computer program (such as a computer program 14 as described with reference to FIG. 9).

In block 201, an indication for indicating/requesting a type of parameter to be reported is received, wherein the indicated type of parameter characterises one or more receive, Rx, beams of a UE via which one or more Reference Signals, RSs, are received.

In block 202 one or more values of the indicated type of parameter are determined for at least one of one or more RSs received via at least one of the one or more Rx beams of the UE.

In block 203, information is sent that is indicative of the determined value of the indicated type of parameter for the at least one of the one or more RSs received by the at least one of the one or more Rx beams of the UE. For example, the UE may send, to the gNB, the determined value of the parameter of the indicated type.

The type of parameter can be one or more of: a type of indicator, a type of robustness indicator, and a type of robustness offset. The robustness indicator can be indicative of a robustness of an Rx beam of the UE via which the at least one of the one or more RSs was received.

The received indication can comprise information indicative of one or more parameters that are to be determined by the UE and reported. The indication of a type of parameter to be reported can comprise information indicative of a type of indicator (such as a robustness indicator or a robustness offset) to be reported by the UE, wherein each indicator is associated with one or more parameters and one or more ranges of values of the one or more parameters (i.e., such that each indicator value is associates one or more parameters values within a particular range).

The indication can be indicative of information for enabling the UE to determine the type of parameter(s)/types of robustness offset(s)/indicator(s) are to be measured and reported to the gNB. For instance, each indication can be associated with particular type of particular parameter. The association as to which indications are associated with which particular type(s) of parameter(s) can be, not least for example, pre-defined, signalled via higher layer signalling or hard coded in the specification.

Each parameter can be a parameter that categories/classifies a beam of the UE, such as a UE's Rx beam via which one or more RSs are received. The parameter can be a "robustness indicator" that indicates a robustness of the Rx beam via which the RS was received. Values of a particular type of robustness indicator can be determined based on a particular measurement performed on an RS received via an Rx beam of the UE, wherein the type of measurement performed is based on the type of robustness indicator to be reported.

The RS can correspond to resources of the RS received via the UE's Rx beam. The RSs can comprise a spatial source RS, such as SSB, CSI-RS or SRS.

One or more values of the indicated type of parameter can be determined for at least one of one or more RSs received by at least one of the one or more Rx beams of the UE.

The determining of the value(s) for the indicated type(s) of parameter(s) can comprise: performing measurements on the RS(s), received via the UE's Rx beam(s), of the indicated parameter to measure a parameter value for the RS(s). For example, the UE can perform a particular type of parameter measurement on an RS received via a Rx beam of the UE, wherein the type of measurement performed is based, at least in part on the indicated type of parameter, i.e., such that the value of the indicated type of parameter can be determined. The determining of the value(s) for the indicated type(s) of parameter(s) can also comprise performing a calculation or processing of the measurement result/measured parameter value, e.g., so as to assign a value to the same which is reported to the gNB, wherein the reported value (i.e., robustness offset value) based, at least in part, on a comparison of the measurement result/measured parameter value with regards to one or more pre-determined range thresholds of the measurement result/measured parameter value. In such a manner, rather than reporting the "raw" measurement result/measured parameter value, a modified version of the same is reported, namely an indication of the measurement result/measured parameter value, wherein the indication is indicative of which group of a plurality of groups of pre-determined range thresholds of measurement results/measured parameter values, the "raw" measured result/measured parameter value resides in. The indication thereby serves to provide a categorisation/classification with respect to a categorisation/classification scheme associated with the indicated parameter.

The determining of the value(s) for the indicated type(s) of parameter(s) can comprise: determining a value of a parameter associated a Rx beam of the UE via which a RS is received. For example, the UE determine a parameter value based, at least in part, on a characteristic an Rx beam of the UE via which an RS is received, and tag/associate the parameter value or an indicator thereof.

The determining of the value(s) for the indicated type(s) of parameter(s), in addition or alternatively, can comprise: categorising or classifying an Rx beam via which an RS is received. For example, categorising an RS received via a Rx beam of the UE into one of several categories, wherein the type of categorisation performed is based, at least in part on the indicated type of parameter, i.e., such that the value of the indicated type of parameter is indicative of the RS's determined classification.

The RS can be associated with/tagged with its respective determined value of the indicated type of parameter, or an indicator thereof (i.e., information indicative of the determined value), which is then reported to the gNB. The information indicative of the determined value of the indicated type of parameter can be associated, by the UE, with its respective RS.

The UE may receive information for enabling the UE to determine how to determine the one or more values of the indicated type of parameter for the at least one of the one or more RSs received by the at least one of the one or more Rx beams of the UE. For instance, such information may indicate what measurements are to be performed and how to calculate the values of the indicated types of parameters from the measurement results. Such information may comprise reporting configuration information which may be signalled to the UE via higher layers, pre-defined or pre-coded in the specification.

Determining the one or more values of the indicated type of parameter for the at least one of the one or more RSs can comprise assigning the at least one of the one or more RSs to one of a plurality of groups that characterises the at least one of the one or more Rx beams of the UE in accordance with the indicated type of parameter.

The information indicative of the determined one or more values of the indicated type of parameter for the at least one of the one or more RSs can comprise one or more indications of one of a plurality of groups, wherein each group is associated with a range of values of the indicated type of parameter.

The information sent can be indicative of determined one or more values of the indicated type of parameter for at least one of one or more RSs received by at least one of the one or more Rx beams of the UE.

The information indicative of a determined value of the indicated type of parameter can be sent: for each individual received RS, and/or for a group of a plurality of received RSs, wherein each RS of the group has the same determined value.

The indicated type of parameter can relate to temporal operational characteristics of the one or more Rx beams via which the one or more RSs were received.

Determining the one or more values of the indicated type of parameter for the at least one of the one or more RSs can be based at least part on a beam switching delay for the UE to switch to the at least one of the one or more Rx beams of the UE via which the at least one of the one or more RSs was received.

The indicated type of parameter can relate to a reception quality of the at least one of the one or more RSs via the at least one Rx beam.

The indicated type parameter can relate to one or more of:
Received Signal Received Power, RSRP, of the at least one of the one or more RSs received via the at least one of the one or more Rx beams of the UE;
Signal to Noise Ratio, SINR, of the at least one of the one or more RSs received via the at least one of the one or more Rx beams of the UE; and
Angle of Arrival, AOA, of the at least one of the one or more RSs received via the at least one of the one or more Rx beams of the UE.

The indicated type of parameter can comprise an indicator indicative of one or more characteristics of at least one transmit, Tx, beam, in correspondence with the at least one of the one or more Rx beams of the UE via which the at least one of the one or more RSs was received.

The indicated type of parameter can relate to one or more of:
Maximum Permissible Exposure, MPE, of at least one Tx beam of the UE in correspondence with the at least one of the one or more Rx beams of the UE via which the at least one of the one or more RSs was received;
power back off of at least one Tx beam of the UE in correspondence with the at least one of the one or more Rx beams of the UE via which the at least one of the one or more RSs was received; and
Angle of Departure, AOD, of at least one Tx beam of the UE in correspondence with the at least one of the one or more Rx beams of the UE via which the at least one of the one or more RSs was received.

In some examples, one or more of the above types of parameters can be used as one or more criterion for characterising/categorising/grouping UL RSs.

One or more first values of the indicated type of parameter can be determined for a first RS received via a first Rx beam; and one or more second values of the indicated type of parameter can be determined for the first RS received via the first Rx beam. In certain situations, such first and second values (i.e., first and second robustness offset values of a particular type for the same RS for the same Rx beam) can be different. This can occur, for instance, when the same RS is received twice by the same Rx beam (but at differing time instances) e.g., the RS is initially received directly/with a direct line of sight, but is it also indirectly received via one or more reflections.

One or more first values of the indicated type of parameter can be determined for a first RS received via a first Rx beam; and one or more second values of the indicated type of parameter can be determined for the first RS received via a second Rx beam. In certain situations, such first and second values (i.e., first and second robustness offset values of a particular type for the same RS for different Rx beams) can be the same. This can occur, for instance, when the same RS is received by differing Rx beams which are operating under the same threshold parameter values for the indicated parameter type.

The indicated type of parameter can be a parameter whose values are associated with one or more Channel Quality Indicator, CQI, indexes. For instance, as shown in FIG. 6, differing values of a parameter (i.e., differing values of robustness offset) can be mapped to a range of CQI indexes. Accordingly, a CQI index range can be determined based on robustness offset values. The association/mapping as to which robustness offset value is associated/mapped with which range of CQI indexes can be, not least for example: pre-defined, signalled via higher layer signalling or hard coded in the specification. In some examples, where the robustness offset is of a type/is defined/configured so as to be indicative of CQI indexes, the reporting of a value of a robustness offset can replace/reduce the need for conventional CQI reporting and conventional signalling for the same. In one example use case, the UE measures a channel condition and transmits a CQI index and a robustness offset value.

The indicated type of parameter can be a parameter whose values are associated with one or more Modulation and Coding Scheme, MCS, indexes. For instance, as shown in FIG. 7, differing values of a parameter (i.e., differing values of robustness offset) can be mapped to a range of MCS indexes. The association/mapping as to which parameter value/robustness offset value is associated/mapped with which range of MCS indexes can be, not least for example: pre-defined, signalled via higher layer signalling or hard coded in the specification. In some examples, where the robustness offset is of a type/is defined/configured so as to be indicative of MCS indexes, the reporting of a value of a robustness offset can replace/reduce the need for conventional MCS reporting and conventional signalling for the same. In one example use case, the gNB transmits an MCS index with a robustness offset value and the UE receives data using one or more Rx beams based on the MCS index and offset. In some examples, an MCS can be determined/adjusted based at least in part on the information indicative of the determined one or more values (i.e., robustness offset indicator values) of the indicated type of parameter for the at least one of the one or more RSs received by the at least one of the one or more Rx beams of the UE. As will be discussed further below, such a determination may involve utilising an Artificial Intelligence, AI/Machine Learning, ML, algorithm to predict an individual MCS index from a range of MCS indexes associated with a specific robustness offset value.

The information indicative of the determined one or more values (i.e., robustness offset value) of the indicated type of parameter for the at least one of the one or more RSs received by the at least one of the one or more Rx beams of the UE can have a fixed bit-length/bitwidth, i.e., the robustness offset values have the same bitwidth irrespective of the type of robustness offset to be reported. For example, the robustness offset values can have a bitwidth of 2, such that the robustness offset values can adopt one of 4 differing values (each value indicative of a quantity of the indicated parameter—e.g., a range of values of the parameter).

One or more beam management operations can be performed based at least in part on the information indicative of the determined one or more values (i.e., robustness offset indicator values) of the indicated type of parameter for the at least one of the one or more RSs received by the at least one of the one or more Rx beams of the UE.

A transmission from the UE can be controlled based at least in part on the information indicative of the determined one or more values (i.e., robustness offset indicator values) of the indicated type of parameter for the at least one of the one or more RSs received by the at least one of the one or more Rx beams of the UE.

In some examples, the robustness offset could be used to facilitate the utilization of Artificial Intelligence, AI, and Machine Learning, ML, algorithms at the gNB and UE.

In some examples, the robustness offset could account for more UE-implementation strategies. The gNB may request the type of robustness offset it wishes the UE to determine and report (i.e., what type of measurement(s) the UE is to perform on received RSs and the interpretation of the same for determining the gNB's requested type of robustness offset that is then reported to the gNB). When the gNB knows the robustness offset, the following UE implementation strategies are possible:

Resources of reference signals (beams) reported/tagged by a UE with the same robustness offset would be an indication of operation (i.e., of the beams that received the RS), under a same threshold parameter (such as e.g., time). For example, the gNB may indicate to the UE a request a 'delay offset' to be determined and reported, i.e., delay/time-based robustness offset, for characterizing Rx beams of the UE so as to indicate which Rx beams of the UE have the same delay in switching therebetween, thereby effectively enabling a grouping of the Rx beams based on their switching times and reporting of the same.

DL: Resources of RSs can be received by UE beams/ spatial filters, which are on the same or on different panels.

UL: Resources of RSs can be transmitted by UE beams/spatial filters, which are on the same or on different panels.

Different robustness offsets assigned to different resources of RSs would categorize/indicate different operations under a specific threshold, e.g., operation within differing particular ranges of threshold values. Whereas the same robustness offsets assigned to different resources of RSs would categorize/indicate the same operation under a specific threshold, e.g., operation within the same particular range of threshold values.

Resources of reference signals (beams) reported/tagged, by the UE, with the same robustness offset would be an indication that the UE uses wider beams but has less often beam change, or there can be narrower beams with power back off (in UL).

In some examples, the robustness offset/indicator can be an indication for alternative DL transmission choices if the same resource of a reference signal is received by different Rx spatial filters, the RSRP/SINR/Angle of Arrival, AoA, etc. being a way in which different offsets can be tagged/ assigned to the same RS. Based on an appropriate type of robustness offset (e.g., an RSRP, SINR and/or AoA based robustness offset) a UE beam width can be effectively be determined, and a wider beam can be used for receiving PDCCH while the narrow beam can be used for receiving PDSCH.

In some examples, the robust offset/indicator can be an indication for alternative UL transmission options, when the same resources of a reference signal are transmitted by different Tx spatial filters, where Angle of Departure, AoD/ power back off/Maximum Permissible Exposure, MPE, etc. being a way in which a different robustness offset can be tagged to the same resource of reference signal.

In some examples, the gNB could use the robustness offset for allowing more advanced link adaptation. The robustness offset could even replace the MCS table reading. For instance, a very robust beam (e.g., with a robustness offset of 3) could mean potential utilization of top, e.g., 4, MCS entries. An open loop link adaptation algorithm at the gNB could be adapted based on the robustness offset (corrections could be lower/smoother with more robust beam).

In some examples, the robustness offset could be used to indicate to the gNB the degree of available fallback.

In some examples, the gNB controls the type of UE robustness offset that is to be reported by the UE (i.e., the UE robustness reporting type) for example by configuring, via higher layers, the type of robustness offset which needs to be reported. Several options of differing types of robustness offsets are possible. The robustness offset, and its type, could be configured by the higher layers in order to select the applicability area. The bitwidth of the robustness offset may be the same for all configured applicability area.

Figure 3:
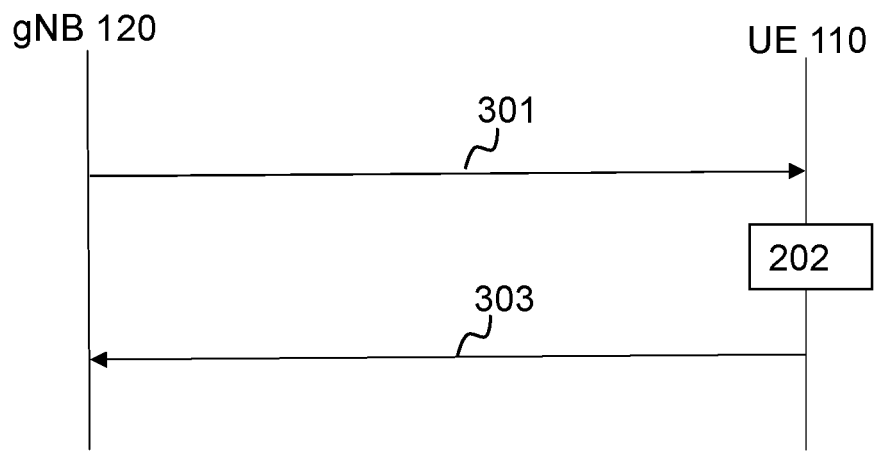
FIG. 3 shows an example of a signal diagram of the present disclosure.

FIG. 3 illustrates a signalling diagram, showing the signalling between a UE 110 and a gNB 120. Such signalling between the UE 110 and gNB 120 may be used, for example, for the gNB to implement the method of FIG. 2.

The gNB 120 sends to the UE 110 a signal 301 for indicating/requesting a type of parameter (i.e., a type of robustness offset) that the UE is to determine and report (i.e., the indication of block 201 of FIG. 2).

In block 202 of FIG. 3, as per block 202 of FIG. 2, the UE 110 determines one or more values of the indicated type of parameter for at least one of one or more RSs received via one or more receive, Rx, beams of the UE.

The UE 110 sends to the gNB 120, a signal 301 including the determined one or more values of the indicated type of parameter for the at least one of the one or more RSs received by the at least one of the one or more Rx beams of the UE (i.e., the information of block 203 of FIG. 2).

In the following section, several use cases of examples of the present disclosure are described. The same overhead of the robustness offset/indicator value, of four bits (i.e., a bit width/bitlength of 2), is assumed in these examples. When the proposed robustness offset type is appropriately configured by the higher layers, the following alternatives are possible:

RSs (beams) tagged with the same value of a robustness offset, of an appropriate type, could indicate operation under the same time threshold. These RSs can be received by UE beams/spatial filters, which are on the same or on different panels. A robustness offset value of 0 could indicate zero OFDM symbols delay for beam switching, whereas a robustness offset value of 3 could indicate a larger time delay for beam switching (for example the duration of 300 OFDM symbols).

RSs (beams) reported with the same value of a robustness offset, of an appropriate type, could indicate that the UE uses wider beams but that the beams change less often, or there can be narrower beams with power back off.

For example, a robustness offset value of 0 could imply a wider beam capable of receiving multiple RSs signals but having low or no power headroom, whereas a robustness offset value of 3 could imply a larger time offset for beam switching but allowing a larger power headroom.

robustness offset/indicator values can be an indication for advanced scheduling alternatives if same RS is received by different Rx beams/spatial filters, the RSRP/SINR/AoA/etc being a way in which different robustness offsets can be tagged to the same RS. Robustness offset values could be utilized for the same RS which is received by the same Rx beam. For example, a robustness offset value of 0 could imply the reception of an RS receiving highest RSRP/SINR/AoA/etc [depending on the type of robustness offset to be reported], whereas a larger robustness offset value could indicate the reception of RSs with a different RSRP/SINR/AoA/etc.

In one example the robustness indication/offset values can be used to aid beam indication for PDCCH and/or PDSCH. As an example, if the UE has been configured with a reporting configuration where it tags the highest robustness (but potentially lowest RSRP/beam gain) for RSs received with wider beams and lowest robustness (but higher RSRP/beam gain) for RSs received with more narrow beams.

such information may guide the network/gNB to configure PDCCH/PDSCH i.e., in a manner such that more robust beams are configured for PDCCH and less robust, but higher quality, beams can be used for PDSCH.

in one further example the robustness offset may be confined within an RSRP threshold range wherein the RS tagged with any robustness indicator has to be within the RSRP range or above RSRP threshold.

Alternatively or additionally, the same strategy can be used for UL signals, i.e., the UE may report/tag the used SRS resources with robustness offset/indicator values.

Based on the example above, different robustness offsets assigned to the different RSs (beam) would indicate to the gNB that one of the RSs (beams) is a subset of the other in terms of used spatial filter, that is one beam is narrower than the other.

The use of robustness offset/indicator can facilitate advanced link adaptation, as will be discussed further below.

Figure 4:
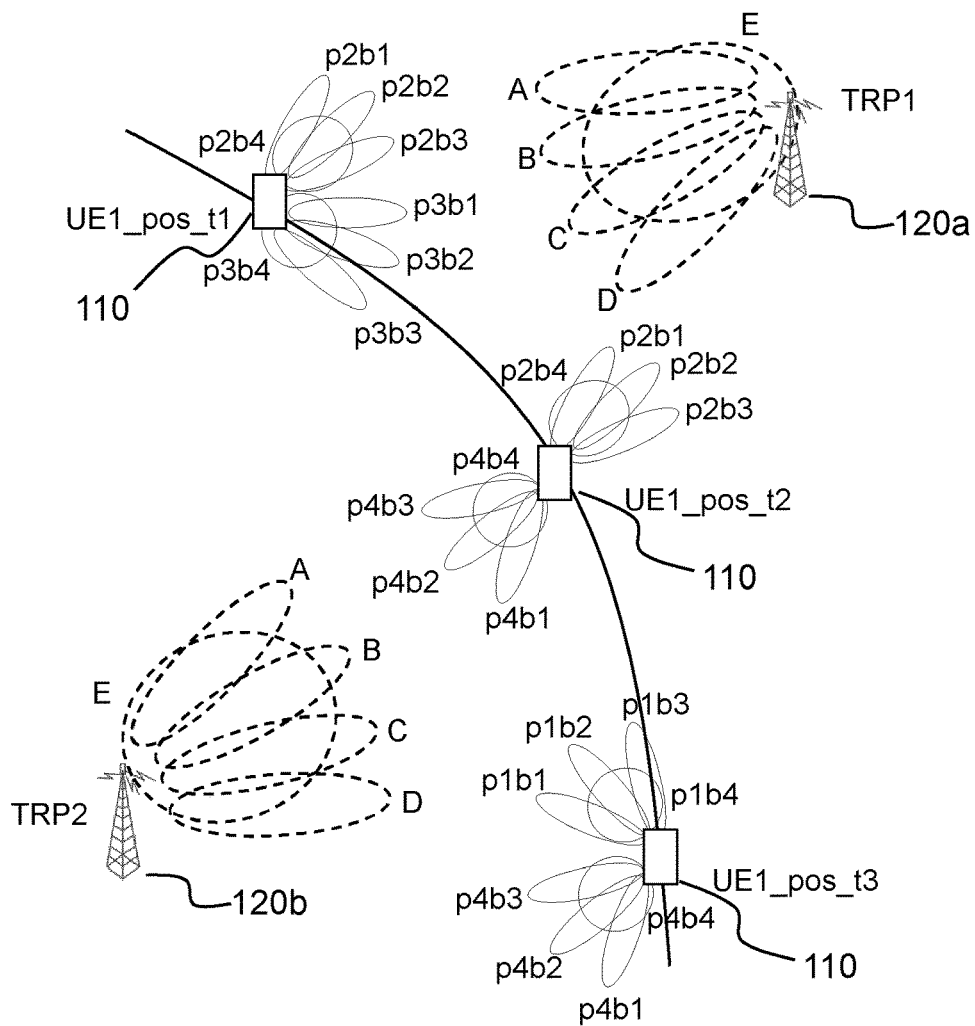
FIG. 4 shows an example of the subject matter disclosed herein.

FIG. 4 shows an example of UE mobility and beam management when robustness offsets and groups are used.

In FIG. 4, a UE 110 is shown moving along a trajectory (i.e., having a first position at t1, a second position at t2 and a third position at t3) and experiencing different transmission conditions at each position as it moves.

Both the gNBs 120a and 120b and the UE 110 are able to form various type of beamwidths, narrow and wide. The UE 110 is equipped with multiple panels. In this particular example, the UE has 4 antenna panels: p1, p2, p3 and p4 (though it is to be appreciated that in other examples the UE may have more or fewer panels). Each panel is capable of forming 4 beams: b1, b2, b3 [all of which, in this example, are narrow beams relative to b4] and b4 [which, in this example, is a wider beam relative to b1-3] (though it is to be appreciated that, in other examples, each panel may form differing numbers of differing shapes/widths/types of beams). The UE can form various Rx beams based on which panel and which beam of a panel is activated.

The TRP1, i.e., gNB 120a, transmits RSs that are received by the UE 110. In this particular example, the gNB 120a transmits RSs A, B, C, D and E (namely: CSI-RS1A, CSI-RS1B, CSI-RS1C, CSI-RS1D and CSI-RS1E). The TRP2, i.e., gNB 120b, transmits RSs that are received by the UE 110. In this particular example, the gNB 120b transmits RSs A, B, C, D and E (namely: CSI-RS2A, CSI-RS2B, CSI-RS2C, CSI-RS2D and CSI-RS2E). Each gNB can form various Tx beams that effectively correspond to/are defined by the transmitted CSI-RSs.

For each Tx-Rx beam pair, namely with respect to what the UE may utilise as Rx beams for the reception of the transmitted RSs, a beam robustness offset value/indicator is determined in accordance with a type of robustness offset that the gNB has indicated the UE is to report. In this example, the type of robustness offset the UE has been indicated/request to report is a time-based robustness offset, wherein robustness offset values are indicative of Rx beams operating under the same time threshold.

The determined robustness offset value/indicator is assigned with respect to what the UE may utilise as Rx beams for the reception of the transmitted RS.

At a first position at time t1, there is a set of beam pairs between the gNB and UE. It is understood that the reference signals which are received by the same beam are part of the same group, for example CSI-RS1A and CSI-RS1B are received by UE beam p2b4 (panel2_beam4) and they are part of group #1. For each received RS, the UE is able to report a robustness offset value, which in this example is ranging from 0 to 3, with 0 being the least robust and 3 being the highest robustness (see, not least for example FIG. 6).

In this particular example, the following robustness offset values/beam robustness indicators are determined by the UE 110 at three differing times (t1, t2 and t3), and respective positions at those times, as the UE moves along a trajectory:

| | Beam pair qualities at t1 | | |
|---|---|---|---|
| UE panel/beam index | RS | Robustness offset value/indicator | Beam group |
| p2b2 | CSI-RS1A | off = 3 | g = 0 |
| p2b2 | CSI-RS1A | off = 2 | g = 0 |
| p2b4 | CSI-RS1A | off = 3 | g = 1 |
| p2b3 | CSI-RS1A | off = 2 | g = 2 |
| p2b4 | CSI-RS1B | off = 3 | g = 1 |
| p3b1 | CSI-RS1C | off = 0 | g = 3 |
| p3b2 | CSI-RS1D | off = 1 | g = 4 |
| p3b4 | CSI-RS1C | off = 3 | g = 5 |

| | Beam pair qualities at t2 | | |
|---|---|---|---|
| UE panel/beam index | RS | Robustness offset value/indicator | Beam group |
| p2b1 | CSI-RS1D | off = 3 | g = 0 |
| p2b4 | CSI-RS1D | off = 3 | g = 1 |
| p2b4 | CSI-RS1E | off = 3 | g = 1 |
| p4b3 | CSI-RS2A | off = 1 | g = 2 |
| p4b4 | CSI-RS2B | off = 3 | g = 3 |
| p4b2 | CSI-RS2B | off = 1 | g = 4 |

| Beam pair qualities at t3 | | | |
|---|---|---|---|
| UE panel/beam index | RS | Robustness offset value/indicator | Beam group |
| p1b4 | CSI-RS2D | off = 2 | g = 0 |
| p1b1 | CSI-RS2D | off = 3 | g = 1 |
| p4b4 | CSI-RS2D | off = 2 | g = 2 |
| p4b3 | CSI-RS2A | off = 1 | g = 3 |

Such robustness offset values/beam robustness indicators are assigned/tagged to the received RSs and reported to the serving gNB. As is evident from the above, an RS may be assigned/tagged with multiple robustness offset values/beam robustness indicators. Moreover, it is to be appreciated that the robustness offset values are separate from and differ to the group indications.

Assigning a robustness offset values to received RS, e.g., such as illustrated in FIG. 4, could account for more UE-implementation strategies and could facilitate at least one or more of the following:
  allow improved management and handling, by the UE, of the power consumption of panels, e.g., by turning them on or off in advance;
  the UE can deactivate any panels for other signals as long as the robustness offset values can be assumed for current operation. In one example, when UE has determined and signalled back to the network/gNB the robustness offset values for at least one DL RS and the network/gNB configures at least one of the DL RS associated with at least one robustness offset value as for PDCCH/PDSCH reception, the UE may assume the RS tagged with same robustness offset value is used for any subsequent communication by the network/gNB, e.g., for a time duration or until the UE is configured otherwise.
  allow the gNB to have a more advanced link adaptation; and
  indicate to the gNB the degree of available fallback beams that could be used.

In the example of FIG. 4, and the above table of robustness offset values, it is notes that the following possible scenarios are possible:
  (a) the same RS is received with the same Rx beam (i.e., the same Rx spatial filter) and is tagged twice, with different robustness offsets.
  (b) the same RS is received with different Rx beams (i.e., differing Rx filters) and is tagged twice, with the same robustness offset.

With regards to (a) above, an RS may be received multiple times by the same UE panel/beam and may be assigned/tagged with multiple robustness offset values/beam robustness indicators for the same. For instance, in the first two entries in the above table for time t1:

| p2b2 | CSI-RS1A | off = 3 | g = 0 |
|---|---|---|---|
| p2b2 | CSI-RS1A | off = 2 | g = 0 | the same RS, CSI-RS1A, is received with the same Rx filter and tagged twice, with different robustness offset values. (It is also noted that whilst the two values of robustness offset can differ, the respective beam group indications can be the same). Such a scenario where the same RS (CSI-RS1A) is received by the same panel/beam (p2pb) twice may arise where the RS is firstly received as a direct line of sight reception, and is then also received via an indirect reception wherein the RS has been reflected from one or more surfaces prior to receipt via p2b2.

At time/position t1, the UE receives CSI-RS1A on the same panel #2, with the same Rx spatial filter (beam) #2 but it is tagged with different robustness offsets off=3 and off=2. This means that the same UE beam p2b2 is receiving two copies of the CSI-RS1A. These two receptions are with different statistics/receive metric which may imply different: RSRP, SINR, AoA, AoD, Spatial channel correlation, etc. The receive metric (based on which the robustness offset value is determined) may be UE implementation specific. The reporting to the gNB of two (or more) robustness offset values for the same RS, CSI-RS1A, received with the same Rx beam/filter indicates to the gNB the fact that the RS is received in two (or more) instances. These two (or more) instances may serve as transmission alternatives for the gNB in case one of the links fails. The use of such robustness offsets may thereby facilitate advanced scheduling alternatives. In one particular implementation, a downlink RS that is received in two (or more) instances may be used in different beam pair links with UL signals.

With regards to (b) above, the same RS is received with different Rx beams/spatial filters and is tagged twice, with the same robustness offset. For instance, in the first and third entries in the above table for time t1:

| p2b2 | CSI-RS1A | off = 3 | g = 0 |
|---|---|---|---|
| p2b4 | CSI-RS1A | off = 3 | g = 1 | the same RS (CSI-RS1A) is received by two differing panel/beams (p2pb2 and p2b4) has two values of robustness offset which can be the same (off=3 and off=3). It is also noted that whilst the two values of robustness offset can be the same, the respective beam group indications can differ. In this instance, the RS CSI-RS1A received via p2b2 being tagged with the same robustness offset value as that for the RS CSI-RS1A received via p2b4 is indicative that the UE's beams p2b2 and p2b4 are operating under the same threshold parameter (such as e.g., time) associated with the type of robustness indicator being reported (wherein the type of robustness indicator to be determined and reported by the UE is signalled to the UE by the gNB).

At time/position t1, the UE receives the CSI-RS1A on panel #2 but in different beams #2 and #4. This would indicate to the gNB that one of the reference signals (Tx beams of the gNB) is a subset of the other in terms of spatial filter used by the gNB; that is one beam is narrower than the other. Such information may guide NW/gNB to configure PDCCH/PDSCH i.e., in a manner such that more robust beams (off=3) are configured for PDCCH and less robust but higher quality can be used for PDSCH (off=2). The use of such robustness offsets may thereby facilitate advanced scheduling alternatives.

Figure 5:
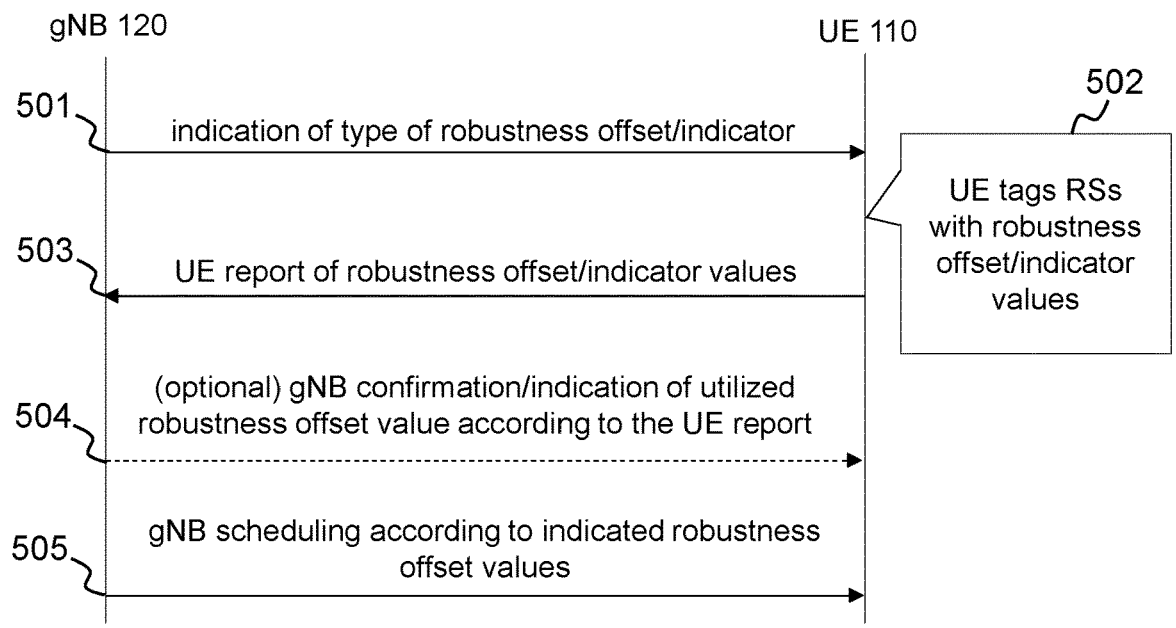
FIG. 5 shows another example of a signal diagram of the present disclosure.

FIG. 5 illustrates a signalling diagram, showing the signalling between a gNB 120 and a UE 110. Such signalling between the gNB 120 and UE 110 may be used to implement the above-described methods and functionality.

The gNB 120 sends to the UE 110 a signal 501 for indicating/requesting a type of parameter (i.e., a type of robustness offset/indicator) that the UE is to determine and report. The signalled indication can be an indication of a type of robustness offset/indicator, not least for example such:

a robustness offset/indicator for indicating beams of the UE are operating under the same threshold (e.g., same time threshold);

a robustness offset/indicator for facilitating advanced scheduling; and/or a robustness offset/indicator for facilitating advanced link adaptation.

It is to be appreciated that the exact method by which the values of the robustness offset are to be determined/calculated may be pre-determined, hard coded in the specification, controlled by gNB (wherein the gNB would inform the gNB as to what the rules for calculating the robustness offset values are) or determined by the UE (wherein the UE would inform the gNB as to what the rules for calculating the robustness offset values are).

The gNB 120 can also send the UE 110 configuration information/parameters for the robustness offset related signalling (such as which one or more metrics the robustness offset is to be indicative of, how values of the measured/determined/calculated metrics are to be reported, i.e., mapped onto a robustness offset value to be reported). In effect, the gNB can inform the UE how and what to report in its robustness offset values to be reported.

In block 502, the UE determines robustness offset/indicator values for DL RSs sent by the gNB (not shown) and received via Rx beams of the UE, wherein the robustness offset/indicator values are determined in accordance with the type of robustness offset/indicator requested in the request 501. The UE also tags the RSs with the determined values of the robustness offset in accordance with the indicated gNB request. In some examples. the UE determines robustness offset/indicator values for UL RSs it sends to the gNB (not shown) via Tx beams of the UE (which may correspond to Rx beams of the UE, i.e., Tx beams using the same spatial filters as the Rx beams) and tags the UL RSs with the robustness offset/indicator values determined in accordance with the type of robustness offset/indicator requested in the request 501.

The UE 110 sends to the gNB 120, a signal/report 503 for indicating the values of the robustness offset/indicator that were determined in block 502. Such feedback/report of the robustness offset/indicator values can be provided on a per DL RS basis (or, where the RSs are UL RSs, the robustness offset/indicator values can be reported on a per UL RS basis).

Optionally, via optional signal 504 sent from the gNB to the UE, the gNB can indicate/confirm, e.g., via DCI, the utilised robustness offset value according to the UE's report 502 indicating the determined values of the robustness offset values.

The gNB sends, via signal 505, scheduling information to the UE, wherein the scheduling information is based, at least in part, on the robustness offset values reported via the UE's report 502.

The following is a discussion of yet further applications, uses and implementation strategies that may be adopted when using robustness offsets/indicators in beam management.

In some examples, robustness offset values can be used to effect faster utilization of reported CQI and MCS selection. The following procedures are an exemplary application.

With regards to using robustness offset values for CQI selection, the UE measures RSs and tags each RS (or a group of RSs that experience the same robustness offset value) with a robustness offset value, which may be based on a measured/calculated metric, such as RSRP or SINR calculation. The UE can follow similar procedures as for CQI derivation, or on other measures (not least such as: AoA, etc.). For example, four CSI-RSs received with different RSRPs, may be tagged with four different robustness offset values, the CSI-RS experiencing the highest CSI-RS RSRP is assigned a robustness offset value of 3, while the CSI-RS experiencing the lowest RSRP is assigned a robustness offset value of 0.

FIG. 6 shows an example of a mapping of robustness offset values to Channel Quality Indicator, CQI, Indexes. Advantageously, the signalling for indicating a CQI index via a robustness offset indicator as compared to the conventional manner of signalling a CQI index, is reduced from 4 bits to 2 bits. Whilst the 2-bit indication is more loose in terms of accuracy, this can be compensated by the use of AI/ML algorithms of the gNB. It is understood that more signaling bits would allow the representation of more modulation and coding rates. Also, there is a potential to further reduce the signalling by assigning the same robustness indicator to more RSs, hence avoiding the individual CQI signalling (which happens currently). Such use of robustness offsets may thereby facilitate advanced link adaptation. In some examples, using a type of robustness offset for indicating COQI and determining and reporting values of the same, can replace the current CQI signaling which may thereby reduce CQI reporting period and occasions.

With regards to using robustness offset values for MCS selection, the UE measures RSs and tags each RS (or a group of RSs that experience the same robustness offset value) with a robustness offset value, which may be based on a measured/calculated metric, such as RSRP or SINR calculation. The UE can follow similar procedures as for MCS derivation, or on other measures (not least such as: AoA, etc.). The tagged RSs are reported to the gNB which interprets the robustness offset values with regards to a MCS table such as shown in FIG. 7. Two bits indication might indicate QPSK and 16 QAM by one bit, while 64QAM by another bit. Four bits indication might indicate QPSK, 16QAM and 64QAM by separate bits.

FIG. 7 shows an example of a mapping of robustness indicators to Modulation and Coding Scheme, MCS, Indexes. In this, RSs/beams tagged with a robustness offset value of 3 could use a pool of the highest MCSs as shown, while RSs/beams tagged with a robustness offset value of 0 could use pool of lowest MCSs.

In some examples, the robustness offset value could be an input in an AI/ML link adaptation finetuning algorithm used by the gNB, whose output is a more accurate MCS selection which is finally indicated to the gNB. In some examples, both the gNB and the UE could run AI/ML link adaptation algorithms. In general, the following procedures would be possible implementations of an advanced system:

Where only the gNB uses an AI/ML link adaptation finetuning algorithm, the following steps may be employed:
1. The UE assigns robustness offset values to the measured RSs.
2. The UE feeds back to the gNB the robustness offset values (either individually for each RS or by grouping the RSs experiencing the same robustness offset value).
3. The gNB uses the indicated robustness offset values as an input into an AI/ML algorithm whose output is a more accurate selection of an MCS. Other inputs into the AI/ML algorithm may be an ACK/NACK received from the UE for a PDSCH transmission or other forms of acknowledgement from the UE which are an indication of the previous MCSs utilized by the gNB.
4. The gNB indicates the selected MCS to the UE and uses it in upcoming transmission(s).

Where both the gNB and the UE use an AI/ML link adaptation finetuning algorithm, the following steps may be employed:
1. The UE assigns robustness offset values s to the measured RSs.
2. The UE feeds back to the gNB the robustness offset values (either individually for each RS or by grouping the RSs experiencing the same robustness offset value)
3. The UE uses the indicated robustness offset value as an input into an AI/ML algorithm whose output is a more accurate MCS.
4. The gNB uses the indicated robustness offset as an input into an AI/ML algorithm whose output is a more accurate MCS. Other inputs into the AI/ML algorithm may be the ACK/NACK received from the UE for the PDSCH transmission or other forms of acknowledgement from the UE which are an indication of the previous MCSs utilized by the gNB.
5. The gNB indicates to the UE, with one bit, that fact that the output of its AI/ML algorithm has the same robustness offset value which is used to consider MCS entries from a predefined MCS table (such as in FIG. 7). This indication allows the UE to make the assumption that the MCS derived at the UE side (point 3 above) can be used for the decoding of the incoming data.

In the above procedure, the current 5-bit MCS field of a DCI is replaced by a 1-bit indication as described above at point 5. For example, the 1-bit indication would represent multiple modulation and coding rates, letting the UE obtaining the final MCS.

Various, but not necessarily all, examples of the present disclosure can take the form of an apparatus, a method or a computer program. Accordingly, various, but not necessarily all, examples can be implemented in hardware, software or a combination of hardware and software.

Various, but not necessarily all, examples of the present disclosure have been described using flowchart illustrations, schematic block diagrams and signalling diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

Figure 8:
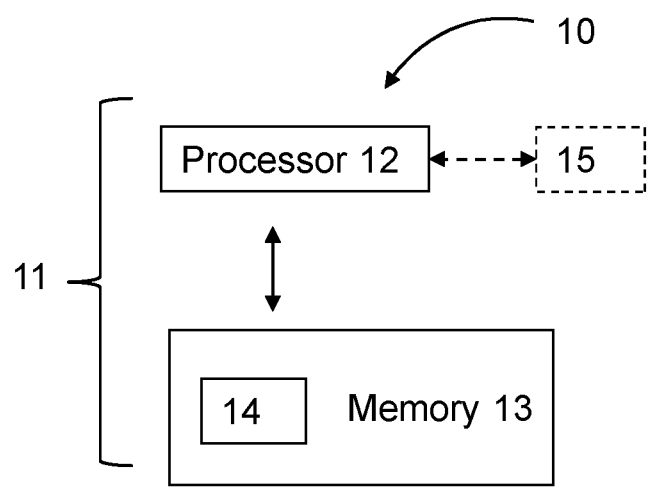
FIG. 8 shows an example of an apparatus of the present disclosure.

FIG. 8 schematically illustrates a block diagram of an apparatus 10 for performing the methods, processes, procedures and signalling described in the present disclosure and not least those illustrated in FIGS. 2, 3, 4 and 5. In this regard the apparatus 10 can perform the roles of a UE 110 (or, where appropriate, the role of a RAN node/gNB 120). The component blocks of FIG. 10 are functional and the functions described can be performed by a single physical entity.

The apparatus comprises a controller 11, which could be provided within a device such as a UE 110, or a gNB 120.

The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and not least as illustrated in FIGS. 2-5. In addition, the CQI/MCS tables shown in FIGS. 6 and 7 can be stored in the memory 13. The processor 12 by reading the memory 13 is able to load and execute the computer program 14.

Although the memory 13 is illustrated as a single component/circuitry it can be implemented as one or more separate components/circuitry some or all of which can be integrated/removable and/or can provide permanent/semi-permanent/dynamic/cached storage.

Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and not least as illustrated in FIGS. 2-5. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e., for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In examples where the apparatus is provided within a UE 110, the apparatus comprises:
at least one processor 12; and
at least one memory 13 including computer program code, the at least one memory 13 and the computer program code configured to, with the at least one processor 12, cause the apparatus at least to perform:
receiving an indication of a type of parameter to be reported by the UE, wherein the type of parameter characterises one or more receive, Rx, beams of the UE via which one or more Reference Signals, RSs, are received;
determining one or more values of the indicated type of parameter for at least one of the one or more RSs received by at least one of the one or more Rx beams of the UE; and
sending information indicative of the determined one or more values of the indicated type of parameter for the at least one of the one or more RSs received by the at least one of the one or more Rx beams of the UE.

In examples where the apparatus is provided within a Radio Access Network, RAN, node, 120, the apparatus comprises:
at least one processor 12; and
at least one memory 13 including computer program code, the at least one memory 13 and the computer program code configured to, with the at least one processor 12, cause the apparatus at least to perform:
sending an indication of a type of parameter to be reported by a User Equipment, UE, wherein the type of parameter characterises one or more receive, Rx, beams of the UE via which one or more Reference Signals, RSs, are received; and
receiving information indicative of one or more values, determined by the UE, of the indicated type of parameter for the at least one of the one or more RSs received by the at least one of the one or more Rx beams of the UE.

According to some examples of the present disclosure, there is provided a system (for example at least one UE 110 and a RAN node 120).

The above described examples find application as enabling components of: telecommunication systems; tracking systems, automotive systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

Figure 9:
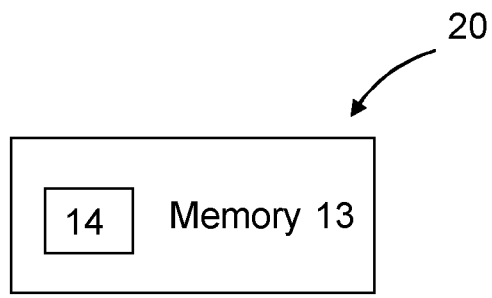
FIG. 9 shows an example of a computer program of the present disclosure.

FIG. 9, illustrates a computer program 14 conveyed via a delivery mechanism 20. The delivery mechanism 20 can be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. The apparatus 10 can receive, propagate or transmit the computer program as a computer data signal.

In certain examples of the present disclosure, there is provided computer program instructions for causing a UE 110 to perform at least the following or for causing performing at least the following:
  receiving an indication of a type of parameter to be reported by the UE, wherein the type of parameter characterises one or more receive, Rx, beams of the UE via which one or more Reference Signals, RSs, are received;
  determining one or more values of the indicated type of parameter for at least one of the one or more RSs received by at least one of the one or more Rx beams of the UE; and
  sending information indicative of the determined one or more values of the indicated type of parameter for the at least one of the one or more RSs received by the at least one of the one or more Rx beams of the UE.

In certain examples of the present disclosure, there is provided computer program instructions for causing a Radio Access Network, RAN, node 120 to perform at least the following or for causing performing at least the following:
  sending an indication of a type of parameter to be reported by a User Equipment, UE, wherein the type of parameter characterises one or more receive, Rx, beams of the UE via which one or more Reference Signals, RSs, are received; and
  receiving information indicative of one or more values, determined by the UE, of the indicated type of parameter for the at least one of the one or more RSs received by at least one of the one or more Rx beams of the UE.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' can refer to one or more or all of the following:
  (a) hardware-only circuitry implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation. Features described in the preceding description can be used in combinations other than the combinations explicitly described. Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent. Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: measuring, calculating, computing, processing, deriving, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter (for example a robustness indicator) can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

What is claimed is:

1. A User Equipment (UE) comprising:
   at least one processor; and
   at least one memory including computer program instructions, the at least one memory and the computer program instructions are configured to, with the at least one processor, cause the UE at least to:
   receive an indication of a type of parameter to be reported by the UE, wherein the type of parameter characterizes one or more receive (Rx) beams via which the UE receives one or more Reference Signals (RSs), and wherein the type of parameter comprises a beam robustness indicator that is based on at least one of a switching time for an Rx beam, a Reference Signal Received Power (RSRP) of a Reference Signal (RS), a Signal to Interference plus Noise Ratio (SINR) of the RS, or an Angle of Arrival (AoA) of the RS;
   receive configuration information for determining values of the indicated type of parameter, the configuration information indicating how to assign values via threshold ranges;
   determine values of the indicated type of parameter for at least one RS of the one or more RSs received by at least one of the one or more Rx beams of the UE, wherein a common value of the beam robustness indicator assigned to different RSs indicates operation of respective Rx beams under a common threshold parameter, and wherein the determination includes determining multiple different values for a single RS of the one or more RSs received via a single Rx beam of the one or more Rx beams, each of the multiple different values corresponding to a different reception instance of the single RS via the same Rx beam, wherein one reception instance corresponds to a direct line-of-sight path and another reception instance corresponds to an indirect path resulting from reflection, and wherein each reception instance is associated with a different receive metric; and
   send information indicative of the determined values of the indicated type of parameter, wherein the information comprises, for each RS, an indication of a robustness offset value and an associated group identifier selected from a plurality of groups, each group corresponding to a predefined range of values of the indicated type of parameter, such that: (i)

different robustness offset values for the same RS received via a single Rx beam correspond to different reception instances with different receive metrics, and (ii) RSs tagged with a same group identifier indicate reception via Rx beams operating under a common threshold parameter, thereby enabling classification of RSs according to robustness characteristics for scheduling and fallback purposes.

2. The UE of claim 1, wherein the indicated type of parameter comprises:
an indicator indicative of one or more characteristics of the at least one of the one or more Rx beams of the UE via which the at least one of the one or more RSs was received; and
one or more robustness indicators, wherein the one or more robustness indicators are indicative of a robustness of the at least one of the one or more Rx beams of the UE via which the at least one of the one or more RSs was received.

3. The UE of claim 2, wherein the at least one memory and the computer program instructions are configured to, with the at least one processor, cause the UE at least to:
receive, via the at least one of the one or more Rx beams of the UE, the at least one of the one or more RSs.

4. The UE of claim 3, the at least one memory and the computer program instructions configured to, with the at least one processor, cause the UE at least to perform:
receiving information for enabling the UE to determine how to determine the one or more values of the indicated type of parameter for the at least one of the one or more RSs received by the at least one of the one or more Rx beams of the UE.

5. The UE of claim 4, wherein the at least one memory and the computer program instructions are configured to, with the at least one processor, cause the UE at least to:
assign the at least one of the one or more RSs to one of a plurality of groups that characterizes the at least one of the one or more Rx beams of the UE in accordance with the indicated type of parameter.

6. The UE of claim 5, wherein the indicated type of parameter relates to temporal operational characteristics of the one or more Rx beams of the UE via which the one or more RSs were received.

7. A method for a User Equipment (UE), the method comprising:
receiving an indication of a type of parameter to be reported by the UE, wherein the type of parameter characterizes one or more receive (Rx) beams via which the UE receives one or more Reference Signals (RSs), and wherein the type of parameter comprises a beam robustness indicator that is based on a switching time for an Rx beam, a Reference Signal Received Power (RSRP) of a Reference Signal (RS), a Signal to Interference plus Noise Ratio (SINR) of the RS, and an Angle of Arrival (AoA) of the RS;
receiving configuration information for determining one or more values of the indicated type of parameter, the configuration information indicating how to assign values via threshold ranges;
determining values of the indicated type of parameter for at least one RS of the one or more RSs received by at least one of the one or more Rx beams of the UE, wherein a common value of the beam robustness indicator assigned to different RSs indicates operation of respective Rx beams under a common threshold parameter, and wherein the determination includes determining multiple different values for a single RS of the one or more RSs received via a single Rx beam of the one or more Rx beams, each of the multiple different values corresponding to a different reception instance of the single RS via the same Rx beam, wherein one reception instance corresponds to a direct line-of-sight path and another reception instance corresponds to an indirect path resulting from reflection, and wherein each reception instance is associated with a different receive metric; and
sending information indicative of the determined values of the indicated type of parameter, wherein the information comprises, for each RS, an indication of a robustness offset value and an associated group identifier selected from a plurality of groups, each group corresponding to a predefined range of values of the indicated type of parameter, such that: (i) different robustness offset values for the same RS received via a single Rx beam correspond to different reception instances with different receive metrics, and (ii) RSs tagged with a same group identifier indicate reception via Rx beams operating under a common threshold parameter, thereby enabling classification of RSs according to robustness characteristics for scheduling and fallback purposes.

8. The method of claim 7, wherein the indicated type of parameter comprises:
an indicator indicative of one or more characteristics of the at least one of the one or more Rx beams of the UE via which the at least one of the one or more RSs was received; and/or
one or more robustness indicators, wherein the one or more robustness indicators are indicative of a robustness of the at least one of the one or more Rx beams of the UE via which the at least one of the one or more RSs was received.

9. The method of claim 8, comprising:
receiving, via the at least one of the one or more Rx beams of the UE, the at least one of the one or more RSs.

10. The method of claim 9, comprising:
receiving information for enabling the UE to determine how to determine the one or more values of the indicated type of parameter for the at least one of the one or more RSs received by the at least one of the one or more Rx beams of the UE.

11. The method of claim 10, comprising:
assigning the at least one of the one or more RSs to one of a plurality of groups that characterises the at least one of the one or more Rx beams of the UE in accordance with the indicated type of parameter.

12. The method of claim 11, wherein the indicated type of parameter relates to temporal operational characteristics of the one or more Rx beams of the UE via which the one or more RSs were received.

13. A non-transitory computer readable medium encoded with instructions that, when performed by at least one processor, causing a user equipment (UE) to at least perform:
receiving an indication of a type of parameter to be reported by the UE, wherein the type of parameter characterizes one or more receive (Rx) beams via which the UE receives one or more Reference Signals (RSs) and wherein the type of parameter comprises a beam robustness indicator that is based on a switching time for an Rx beam, a Reference Signal Received Power (RSRP) of a Reference Signal (RS), a Signal to Interference plus Noise Ratio (SINR) of the RS, and an Angle of Arrival (AoA) of the RS;

receiving configuration information for determining one or more values of the indicated type of parameter, the configuration information indicating how to assign values via threshold ranges;

determining values of the indicated type of parameter for at least one RS of the one or more RSs received by at least one of the one or more Rx beams of the UE, wherein a common value of the beam robustness indicator assigned to different RSs indicates operation of respective Rx beams under a common threshold parameter, and wherein the determination includes determining multiple different values for a single RS of the one or more RSs received via a single Rx beam of the one or more Rx beams, each of the multiple different values corresponding to a different reception instance of the single RS via the same Rx beam, wherein one reception instance corresponds to a direct line-of-sight path and another reception instance corresponds to an indirect path resulting from reflection, and wherein each reception instance is associated with a different receive metric; and sending information indicative of the determined values of the indicated type of parameter, wherein the information comprises, for each RS, an indication of a robustness offset value and an associated group identifier selected from a plurality of groups, each group corresponding to a predefined range of values of the indicated type of parameter, such that: (i) different robustness offset values for the same RS received via a single Rx beam correspond to different reception instances with different receive metrics, and (ii) RSs tagged with a same group identifier indicate reception via Rx beams operating under a common threshold parameter, thereby enabling classification of RSs according to robustness characteristics for scheduling and fallback purposes.

14. The non-transitory computer readable medium of claim 13, wherein the indicated type of parameter comprises:

an indicator indicative of one or more characteristics of the at least one of the one or more Rx beams of the UE via which the at least one of the one or more RSs was received; and/or one or more robustness indicators, wherein the one or more robustness indicators are indicative of a robustness of the at least one of the one or more Rx beams of the UE via which the at least one of the one or more RSs was received.

15. The non-transitory computer readable medium of claim 13, comprising instruction to cause the UE to perform:

receiving, via the at least one of the one or more Rx beams of the UE, the at least one of the one or more RSs.

16. The non-transitory computer readable medium of claim 13, comprising instruction to cause the UE to perform:

receiving information for enabling the UE to determine how to determine the one or more values of the indicated type of parameter for the at least one of the one or more RSs received by the at least one of the one or more Rx beams of the UE.

17. The non-transitory computer readable medium of claim 13, wherein the information indicative of the determined one or more values of the indicated type of parameter for the at least one of the one or more RSs comprises an indication of one of a plurality of groups, wherein each group is associated with a range of values of the indicated type of parameter.

* * * * *